US011187666B2

(12) United States Patent
Durupt

(10) Patent No.: US 11,187,666 B2
(45) Date of Patent: Nov. 30, 2021

(54) METHOD FOR MANUFACTURING A RELATIVE HUMIDITY SENSOR AND RELATIVE HUMIDITY SENSOR

(71) Applicant: MEAS France SAS, Toulouse (FR)

(72) Inventor: Emilien Durupt, Francarville (FR)

(73) Assignee: MEAS FRANCE, Toulouse (FR)

( * ) Notice: Subject to any disclaimer, the term of this patent is extended or adjusted under 35 U.S.C. 154(b) by 0 days.

(21) Appl. No.: 16/446,551

(22) Filed: Jun. 19, 2019

(65) Prior Publication Data

US 2019/0391103 A1 Dec. 26, 2019

(30) Foreign Application Priority Data

Jun. 20, 2018 (EP) .................................... 18305779

(51) Int. Cl.
*G01N 27/22* (2006.01)
*G01N 27/12* (2006.01)

(52) U.S. Cl.
CPC ......... *G01N 27/223* (2013.01); *G01N 27/121* (2013.01); *G01N 27/227* (2013.01)

(58) Field of Classification Search
CPC ... G01N 27/227; G01N 27/223; G01N 27/121
See application file for complete search history.

(56) References Cited

U.S. PATENT DOCUMENTS 4,651,121 A 3/1987 Furubayashi et al.
8,783,101 B2 7/2014 Zhang et al.
2011/0179861 A1 7/2011 Grange et al.
2013/0139587 A1* 6/2013 Le Neel ............... G01N 27/223 73/335.04
2014/0125359 A1* 5/2014 El-Gamal ........... G01L 19/0092 324/664
2016/0377569 A1* 12/2016 Rajaraman .......... B81C 1/00182 257/416

FOREIGN PATENT DOCUMENTS

JP 2007278716 A * 10/2007

* cited by examiner

*Primary Examiner* — Paul M. West

(57) ABSTRACT

The present invention relates to a method of manufacturing a relative humidity sensor comprising the step of; a) providing a first electrode on or over a substrate, b) providing a non-porous inorganic dielectric layer over the first electrode, c) providing a second electrode over the inorganic dielectric layer, and d) forming a pattern of voids in the second electrode and the inorganic dielectric layer through the second electrode. The invention also relates to a relative humidity sensor, in particular one obtained by the inventive method.

18 Claims, 3 Drawing Sheets

METHOD FOR MANUFACTURING A RELATIVE HUMIDITY SENSOR AND RELATIVE HUMIDITY SENSOR

CROSS REFERENCE TO COPENDING PATENT APPLICATION

This patent application claims priority to European Patent Application No. 18305779.3 filed on Jun. 20, 2018, which application is hereby incorporated by reference in its entirety.

FIELD

The present invention relates to a method for manufacturing a relative humidity sensor and relative humidity sensor.

BACKGROUND

Such relative humidity sensors are known in the art. U.S. Pat. No. 8,783,101 B2 discloses a relative humidity sensor based on a nano-structured aluminum oxide thin film. It comprises an anodic aluminum oxide thin film formed from an aluminum substrate which also serves as one electrode. A porous metal layer is formed over the anodic aluminum oxide thin film as a second electrode. This relative humidity sensor is obtained by stamping an aluminum sheet and anodizing it to form the porous aluminum oxide, then the porous metal layer is formed over the aluminum oxide by sputtering. Using solderable electrode pins connected to the electrodes using spring contacts or conductive glue, the obtained sensor can be plugged or soldered into a circuit.

The fabrication method disclosed can, however, not be implemented into high yield microfabrication means which would allow to remove all mechanical assembly steps and to reduce the part to part difference. The parts assembly is tedious and can lead to a lack of alignment precision. Furthermore, an unwanted delamination of the parts can be observed.

U.S. Pat. No. 4,651,121 discloses another moisture sensor comprising a substrate, a bottom electrode over the substrate, and an organic moisture sensitive film sandwiched between the bottom electrode and an upper electrode. The capacitance of the sensor changes when water vapor enters the moisture sensitive film. This effect is used to determine variations in the amount of water vapor in the atmosphere by detecting the corresponding changes of the capacitance.

US 2011/179861 A1 discloses a humidity sensor of capacitive type comprising intedigitated first and second electrodes provided with an intrinsically nanoporous dielectric material of methylsilsesquioxane (MSQ) or SiOCH. A floating electrode might be placed over the nanoporous dielectric. MSQ is an organic polymer, and SiOCH is a porous organic organosilicate.

However, organic material based relative humidity sensors are intrinsically submitted to degrading because of chemical aging of the material and are heat sensitive, amongst others due to a low glass temperature transition. Furthermore, polymer materials are not adapted to stand high temperatures, such as temperatures 300° C. or more, the structure degradation corresponding to the delamination induced by the melt of the metallic layers of the sensors.

It is therefore the object of the present invention to provide an improved relative humidity sensor that can be mass manufactured and provides extended lifetime and temperature range properties.

SUMMARY

This object is achieved with a method of manufacturing a relative humidity sensor comprising the steps of; a) providing a first electrode on or over a substrate, b) providing a non-porous inorganic dielectric layer over the first electrode, c) providing a second electrode over the inorganic dielectric layer, and then d) forming a pattern of voids in the second electrode and the inorganic dielectric layer through the second electrode (21 as shown in FIG. 2*g*).

According to the invention, all process steps can be carried out using microfabrication methods. Hence, the sensor can be fabricated in a fully automated way with high yields and reliability. Using microfabrication during all process steps, the sensor can be downsized to smaller volumes, the overall assembly of the various parts forming the sensor is simplified and alignment can be achieved within the tight limits of microfabrication in contrast to a mechanical assembly, like in the prior art. Essentially any type of non-porous inorganic dielectric layer can be used, as the sensitivity to humidity is not obtained by the change of the effective dielectric constant of a porous material but by probing the modification of the dielectric function the air inside the voids as well as the dielectric constant of the water layer at the thermo-dynamical equilibrium on the sides of the void structures.

At the same time, the obtained humidity sensor is less exposed to aging than sensors with an organic dielectric and a wider temperature range, in particular for temperatures even exceeding 300° C., can be used.

By patterning the dielectric layer and the second electrode during the same process steps, it becomes possible to reduce the total number of process steps.

The present method of manufacturing a relative humidity sensor can be further improved according to various advantageous embodiments.

According to an embodiment, step d) can comprise forming the pattern of voids using photolithography followed by a dry etching or wet etching. By providing the voids, humidity can enter the structure which will change the parameters of the capacitor and will therefore allow to measure humidity. As the pattern is created by a highly repetitive process, humidity sensors with reproducible properties can be fabricated so that it becomes possible to suppress additional calibration steps.

According to an embodiment, the inorganic dielectric layer can be silicon nitride or silicon carbide. Both materials provide improved temperature ranges and thermal shock resistance as well as chemical stability, and more effective mechanical and dielectric properties in comparison with an organic polymer-based dielectric layer or Alumina porous dielectric layer.

According to an embodiment, the voids can have a cylindrical shape and can, e.g., be arranged in a honeycomb pattern. Instead of cylindrical voids also other forms like a plurality of trenches could be formed. Using photolithography, any suitable pattern, with respect to form and size of each void, but also with respect to the arrangement in the pattern of the voids can be achieved, so that the sensor can be designed to the needs of the final product.

According to an embodiment, the inventive method can comprise a step of patterning the first electrode to obtain a pattern voids. According to a further preferred embodiment, the voids in the first electrode and the voids in the second electrode can be arranged in a staggered pattern. Such a voids pattern between the first and the second electrodes allows improving the dynamic of the relative humidity sensor by decreasing the nominal capacitance.

According to an embodiment, the pattern of voids in the first electrode and the second electrode can be complementary and in particular shifted with respect to the other. In case of a repetitive pattern, the period of the pattern can be the same but the phase be shifted, e.g., the phase can be opposite. Thus, according to another embodiment, the voids in the first and second electrode can be arranged such that they do not overlap when looking in the direction perpendicular to the layers. This will further improve the characteristics of the sensing capacitor.

According to an embodiment, the method can comprise a step of forming an adhesion layer, in particular at least one chromium adhesion layer, before forming the first electrode and/or the second electrode. The deposition of an adhesion layer facilitates the growth of the electrode layers and thus contributes to further enhance the long term reliability of the sensor.

According to an embodiment, the method can further comprise a step of providing a capping layer over the first and/or second electrode. By doing so, it becomes possible to prevent short cuts between the first and second electrode by the liquid water absorbed in the voids.

This object is also achieved with a relative humidity sensor which comprises: a substrate, a first electrode on or over the substrate, an inorganic non porous dielectric layer over the first electrode and a second electrode over the dielectric layer, wherein both of the inorganic dielectric layer and the second electrode are provided with voids having the same pattern. This sensor can be fabricated only with microfabrication process steps with high yields of over 90%, and high reliability. In addition, the size of the sensor can be downscaled. Due to the fact that the sensor is fabricated using microfabrication manufacturing methods, e.g., thin layer deposition, photolithography, etching, etc., devices with highly reproducible geometric properties can be obtained, so that it becomes possible to refrain from a calibration step. Essentially any type of non-porous inorganic dielectric layer can be used, as the sensitivity to humidity is not obtained by the change of the effective dielectric constant of a porous material but by probing the modification of the dielectric function the air inside the voids as well as the dielectric constant of the water layer at the thermo-dynamical equilibrium on the sides of the void structures.

As the inorganic dielectric layer and the second electrode have the same pattern, the humidity enters inside the voids such that a liquid water layer stands along the wall surfaces of the voids. Hence, a change of the capacitance value can effectively be measured.

The present relative humidity sensor can be further improved according to various advantageous embodiments.

According to an embodiment, the inorganic dielectric layer can be made of silicon nitride or of silicon carbide. Chemical aging like for organic layers can be reduced or prevented. Further, a sensor working for temperatures of 300° C. or more can be achieved. Thus, the obtained inventive sensor functions in a range that is larger than the temperature range of sensors with an organic dielectric layer. The sensor can be used to detect humidity in gas and/or water in oil or other fluids.

According to an embodiment of the invention, the first electrode can be patterned. Preferably, the first electrode can have a complementary pattern compared to the pattern of the second electrode. According to an embodiment, the pattern of the first and second electrode can be staggered, in particular the pattern of the first and the pattern of the second electrode do not overlap in the direction perpendicular to the layers. This arrangement allows reducing the nominal capacitance c0, obtained in a vacuum, and therefore can improve the dynamic of the sensor as the ration C/C0 increases, with C being the capacitance as a function of the humidity.

The invention will now be described in further detail using advantageous embodiments in an exemplary manner and with reference to the drawings. The described embodiments are merely possible configurations and it must be borne in mind that the individual features as described above can be provided independently of one another or can be omitted altogether while implementing this invention.

DETAILED DESCRIPTION

FIGS. 1*a* to 1*e* illustrate the method of manufacturing a relative humidity sensor according to a first embodiment of the invention. It illustrates the formation of one relative humidity sensor, it is, however, to be understood that the described process is a microfabrication process allowing the formation of a plurality of sensor structures at the same time on one substrate, e.g., one wafer.

Figure 1A:
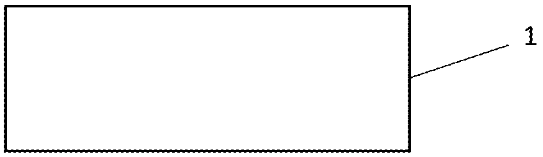
FIGS. 1*a* to 1*e* schematically illustrate the method of manufacturing a relative humidity sensor according to a first embodiment of the invention.

In the following process steps, the various layers necessary to build the relative humidity sensor will be formed. FIG. 1*a* illustrates a substrate 1 which can be a silicon substrate with or without an oxide layer on its surface, a sapphire substrate or any other suitable substrate used in microfabrication production lines. As an alternative, an application-specific integrated circuit (ASIC) could also be used as a starting material of the process according to the invention.

Figure 1B:
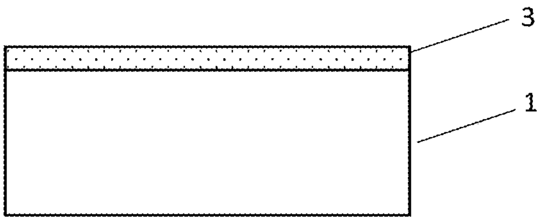

As illustrated in FIG. 1*b*, a layer is formed on or over the substrate 1 and serving as a first electrode 3. The first electrode 3 is a metallic layer, e.g., from Al, Cu, Au or from any other suitable material. According to a variant and in order to improve the adhesion of the first electrode 1 an adhesive layer, e.g., of Cr, can be formed first on the substrate 1 before providing the first electrode 3. The first electrode can be grown with standard layer deposition techniques, e.g., using a PVD (for Physical Vapor Deposition) and CVD (for Chemical Vapor Deposition) process. In this embodiment, the first electrode 3 is grown to a thickness in a range of 0.2 to 100 nm.

Figure 1C:
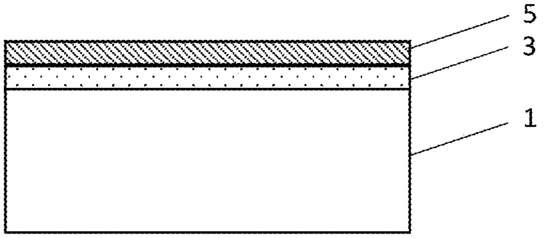

FIG. 1*c* illustrates the result of the formation of a non-porous inorganic dielectric layer 5 over the first electrode 3. In this embodiment, the non-porous dielectric material 5 is silicon nitride or silicon carbide and may be deposited by Plasma Enhanced Chemical Vapour Deposition (PECVD) or any other suitable deposition technique. In this embodiment, the non-porous inorganic dielectric layer 5 is grown to a thickness in a range of 1 to 500 nm.

Figure 1D:
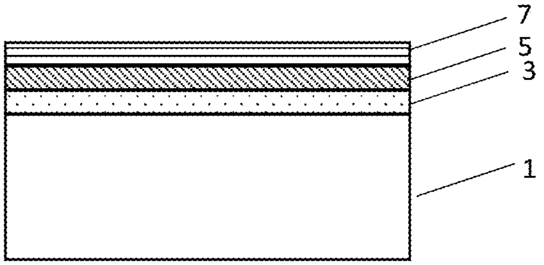

FIG. 1*d* illustrates the result of a further deposition step to form a second electrode 7 over the non-porous inorganic dielectric layer 5. The second electrode 7 is a metallic layer. In this embodiment, the second electrode layer 7 is an Al, Cu or Au layer, but any other suitable conducting material could be used instead. In this embodiment, the second electrode 7 has a typical thickness in a range of 0.2 nm to 100 nm and can be grown by any deposition method, e.g., PVD or CVD. According to a variant, prior to the formation of the second electrode an adhesion layer, e.g., of Cr, can be deposited to improve the adhesion of the second electrode 7 on or over the non-porous inorganic dielectric layer 5.

Figure 1E:
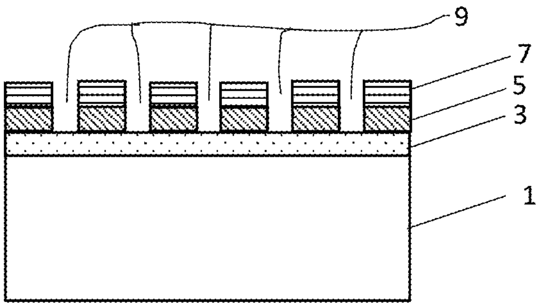

FIG. 1*e* illustrates the result of a photolithography step followed by a dry or wet etching step. Following the etching step, a pattern 9 of voids is formed in the second electrode 7 and in the non-porous inorganic dielectric layer 5. The pattern is the same in the second electrode 7 and the dielectric layer 5. The pattern 9 is a regular pattern, e.g., of cylindrical or trenchlike voids. The width or diameter of the voids is of the order of the physical limit of the photolithography technology used up to about 500 μm, in particular in a range of 100 nm to 100 μm.

Afterwards, the substrate 1 is diced and individual sensors can be packaged. Water vapor entering the voids 9 changes the dielectric properties of the capacitance between the second electrode 7 and the first electrode 3 which can be used to measure the relative humidity. The entire production is realized using microfabrication process steps. This fabrication allows the manufacture of the sensors with high yield and reliability. Furthermore, a sensor of small dimensions, in particular down to 50 μm*50 μm and even smaller can be achieved. Due to the precision of the used process steps, it becomes possible to realize the sensors with a high repeatability of their intrinsic properties. Thus, it is no longer necessary to carry out a calibration of the sensors thereby further simplifying the manufacturing process.

FIGS. 2*a* to 2*g* illustrate a method of manufacturing a relative humidity sensor according to a second embodiment of the invention. With the method according to the second embodiment, a relative humidity sensor can be fabricated in which the first electrode also comprises a pattern of voids. Elements with the same reference numeral already used in FIGS. 1*a* to 1*e* will not be described in detail again but reference is made to their description above.

Figure 2A:
FIGS. 2*a* to 2*g* schematically illustrate the method of manufacturing a relative humidity sensor according to a second embodiment of the invention.
Figure 2B:
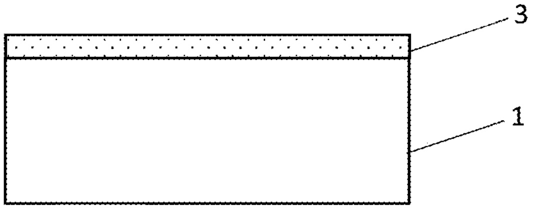

The fabrication steps illustrated in FIGS. 2*a* and 2*b* correspond to the ones of the first embodiment illustrated in FIGS. 1*a* and 1*b* and will therefore not be described again in detail.

In FIG. 2*a*, the substrate 1 is provided and a first electrode 3, in particular a metallic layer, is then formed on or over the substrate 1, like illustrated in FIG. 2*b* and explained above.

Figure 2C:
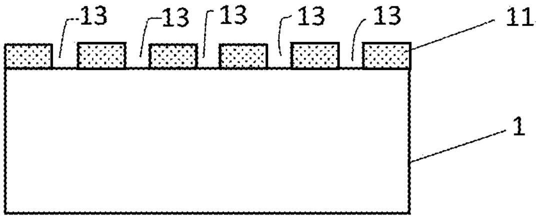

FIG. 2*c* illustrates the result of a patterning step of the first electrode 3. As a result, a modified first electrode 11 with a pattern 13 of voids is obtained. The pattern 13 can be obtained using photolithography and a dry or wet etching. In this embodiment, the voids have a regular pattern, e.g., of cylindrical or trench-like shape.

Figure 2D:
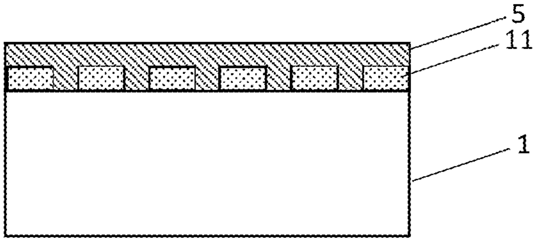

FIG. 2*d* illustrates the result of the formation of the non-porous inorganic dielectric layer 5 over the modified first electrode 11. Like in the first embodiment, the non-porous dielectric material 5 in this embodiment can be any type of inorganic material, in particular silicon nitride or silicon carbide and may be deposited by Plasma Enhanced Chemical Vapour Deposition (PECVD) or any other suitable deposition technique. The non-porous inorganic dielectric layer 5 is grown to a thickness in a range of few nm to several hundreds of μm.

Figure 2E:
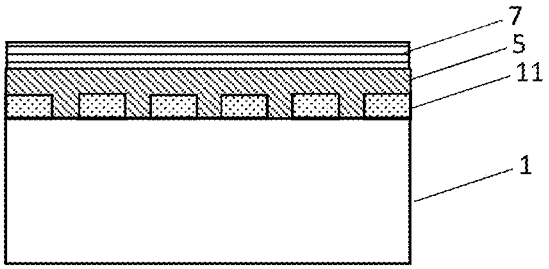

FIG. 2*e* illustrates the result of a further deposition step to form a second electrode 7 over the non-porous inorganic dielectric layer 5. The second electrode 7 is a metallic layer. In this embodiment, the second electrode layer 7 is an Al, Cu or Au layer, but any other suitable conducting material could be used instead. The second electrode 7 has a typical thickness in a range of 0.2 nm to 100 nm and can be grown by any deposition method, e.g., PVD or CVD. According to a variant, prior to the formation of the second electrode an adhesion layer, e.g., of Cr, can be deposited to improve the adhesion of the second electrode 7 on or over the non-porous inorganic dielectric layer 5.

Figure 2F:
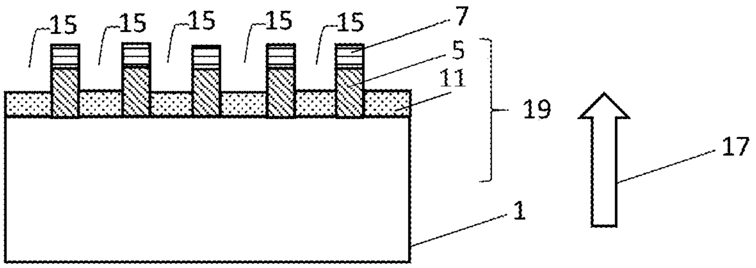

FIG. 2*f* illustrates the result of the following patterning process step. Using photolithography followed by dry or wet etching the second electrode 7 and the non-porous inorganic dielectric layer 5 get patterned at the same time with the same pattern 15 of voids.

In this embodiment, the pattern 15 of voids in the second electrode 7 and the non-porous inorganic dielectric layer 5 is the same regular pattern as the pattern 13 in the modified first electrode 11, but the pattern 15 and the pattern 13 are opposite in phase. The patterns are therefore complementary. Thus, when looking in the direction 17 of the layer stack 19, the first and second electrodes do not overlap laterally. As a consequence, the nominal capacitance C0, corresponding to vacuum conditions, of the capacitor formed by the modified first electrode 11, the patterned non-porous inorganic dielectric layer 5 and the patterned second electrode 7 is reduced. This improves the dynamic of the sensor C/C0.

Figure 2G:
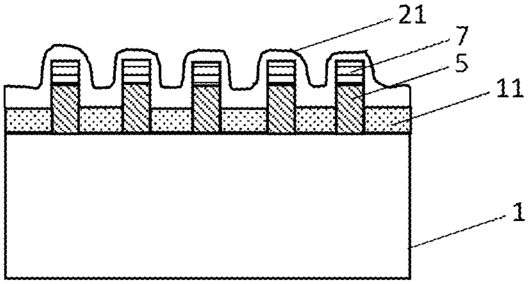

FIG. 2*g* illustrates the result of a further deposition step. During this step, a capping layer 21 is deposited on or over the modified first electrode 11 and/or the second electrode. The addition of a capping layer 21 prevents an electrical short cut of the electrodes due to the electrical conduction through the adsorbed, liquid water. The capping layer can be a SiO2 layer or any other suitable electrically insulating layer.

Afterwards, like in the first embodiment, the substrate 1 is diced and individual sensors are packaged.

Figure 3:
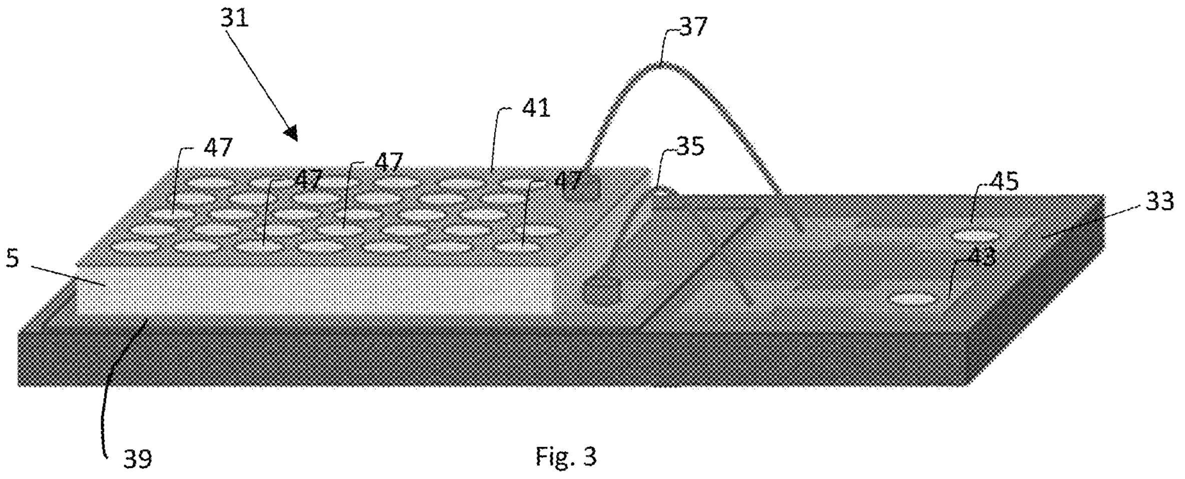
FIG. 3 illustrates a relative humidity sensor according to a third embodiment and fabricated using the first or second embodiment of the invention.

FIG. 3 illustrates a third embodiment of the invention, namely a relative humidity sensor 31 obtained using the method according to the first or second embodiment. FIG. 3 represents a three-dimensional view. Elements with the same reference numeral already used in FIGS. 1*a* to 1*e* and FIGS. 2*a* to 2*g* will not be described in detail again but reference is made to their description above.

The relative humidity sensor is mounted and connected to a printed circuit board (PCB) 33. Using wire bonded connections 35, 37 the first electrode 39 and the second electrode 41 are electrically connected to the electrically conductive traces 43 and 45 of the PCB 33. The capacitance of the humidity sensor 31 can be read out using the traces 43 and 45. The first electrode 39 can be a continuous layer as illustrated in FIG. 1*e* of the first embodiment or like the modified first electrode 11 in FIG. 2*f* of the second embodiment. The second electrode 41 corresponds to the second electrode 7 of the first and second embodiment.

FIG. 3 shows the regular periodic pattern 47 of the voids, as can be seen in FIGS. 1*e* and 2*f*, in the second electrode 41 and the underlying non-porous inorganic dielectric layer 5. The voids are cylindrically shaped and extend entirely through both layers. The pattern is the same in both the second electrode 7 and the non-porous inorganic dielectric layer 5. This actually allows humidity to enter the voids and to change the capacitance of the structure which can then be detected via the conductive traces 43 and 45. By adapting the pattern and/or form and/or size of the voids, the sensor 31 can be adapted to the needs. Using microfabrication, its dimensions can be reduced and reliability can be enhanced. At the same time, due to the repeatability of the process steps, a calibration is no longer necessary.

In FIG. 3, the voids of the pattern 47 have a circular cross-section and are arranged in several rows that are parallel to each other. However, other shapes and arrangements of the voids can be realized as well. In a variant, the voids are arranged in a honeycomb pattern.

Figure 4:
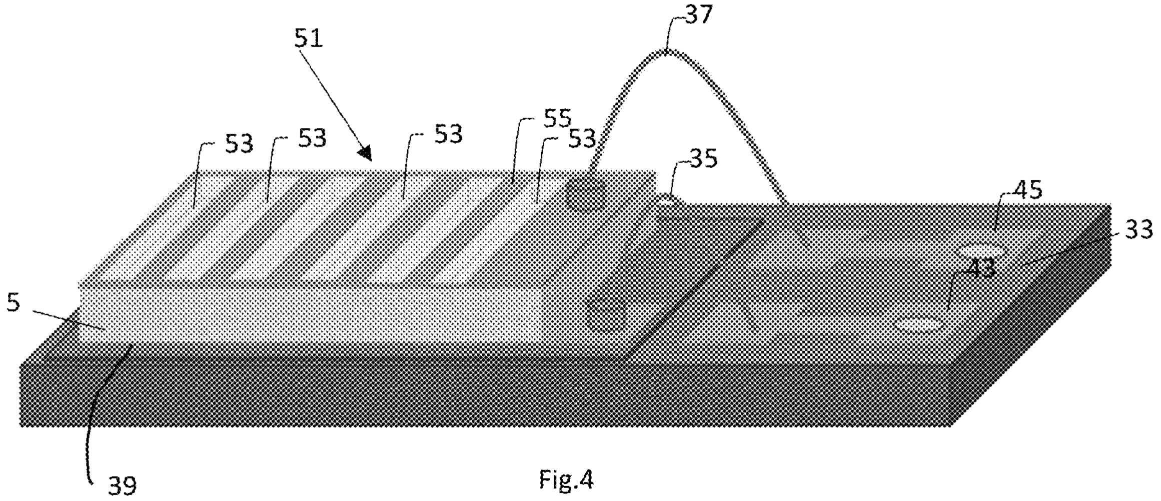
FIG. 4 illustrates a relative humidity sensor according to a fourth embodiment and fabricated using the first or second embodiment of the invention.

In the fourth embodiment, illustrated in FIG. 4, the relative humidity sensor 51 has a modified pattern 53 of voids. In this embodiment, parallel trenches are etched through the second electrode 55 and the non-porous inorganic dielectric layer 57. This is the only difference with respect to the sensor according to the third embodiment of the invention. Features with the same reference numerals already used in the FIGS. 1 to 3 will not be described again but reference is made to their description.

In the above description, the terms deposition step and patterning relate to standard fabrication steps used in the semiconductor manufacturing. As an example, the deposition step can relate to chemical vapor deposition (CVD) or physical vapor deposition (PVD) and patterning step can relate to a lithography imaging and dry or wet etching step.

Modifications to the embodiments and combinations of embodiments of the invention described in the foregoing are possible without departing from the scope of the invention as defined by the accompanying claims. Expressions such as “including”, “comprising”, “consisting of”, “have”, “is” used to describe and claim the present invention are intended to be construed in a non-exclusive manner, namely allowing for items, components or elements not explicitly described also to be present. Reference to the singular is also to be construed to relate to the plural.

REFERENCE NUMBERS

1 substrate
3 first electrode
5 dielectric layer
7 second electrode
9 pattern of voids the dielectric layer and the second electrode
11 modified first electrode
13 pattern of voids in the modified first electrode
15 pattern of voids in the dielectric layer and the second electrode
17 direction of the layer stack
19 layer stack
21 passivation/capping layer
31 relative humidity sensor according to the third embodiment
33 printed circuit board
35 wire bonded connection
37 $2^{nd}$ wire bonded connection
39 first electrode
41 second electrode
43 conductive trace
45 $2^{nd}$ conductive trace
47 pattern of voids
51 relative humidity sensor according to the fourth embodiment
53 pattern of voids
55 second electrode
57 non-porous inorganic dielectric layer

What is claimed is:

1. A method of manufacturing a relative humidity sensor comprising the steps of:

a) providing a first electrode formed from a metallic material on or over a substrate;
b) providing a dielectric layer formed from a non-porous inorganic material the first electrode;
c) providing a second electrode formed from a metallic material over the dielectric layer; and
d) forming a pattern of voids in the second electrode at a time that the outmost surface of the sensor is the second electrode, wherein the pattern of voids extend through the second electrode and the dielectric layer, and wherein the voids extend to the first electrode such that a surface of the first electrode is exposed to moisture that enters the voids;

wherein the only dielectric layer of the sensor is the dielectric layer disposed between the first and second electrodes formed from the non-porous inorganic material.

2. The method of manufacturing a relative humidity sensor according to claim 1, wherein step d) comprises forming the pattern of voids by photolithography and/or dry etching or wet etching.

3. The method of manufacturing a relative humidity sensor according to claim 1, wherein the dielectric layer is made of silicon nitride or silicon carbide.

4. The method of manufacturing a relative humidity sensor according to claim 1, wherein the voids have a shape that is selected from the group consisting of a cylindrical shape and a trench shape.

5. The method of manufacturing a relative humidity sensor according to claim 1, further comprising before the step of providing the dielectric layer, a step of patterning the first electrode with voids that extend through the first electrode to the substrate.

6. The method of manufacturing a relative humidity sensor according to claim 5, wherein the pattern of voids in the first electrode are staggered relative to the pattern of voids in the second electrode and the dielectric layer.

7. The method of manufacturing a relative humidity sensor according to claim 5, wherein the pattern of voids in the first electrode is shifted relative to the pattern of voids in the second electrode and the dielectric layer such that the voids in the first electrode do not overlap the voids in the second electrode and dielectric layer when viewed in a direction perpendicular to the layers.

8. The method of manufacturing a relative humidity sensor according to claim 1, wherein the voids in the second electrode and the dielectric layer have a constant dimension as measured between opposed second electrode surfaces and dielectric layer surfaces extending through the second electrode to the surface of the first electrode.

9. The method of manufacturing a relative humidity sensor according to claim 1, further comprising a step of providing an adhesion layer prior to forming one or both of the first electrode and the second electrode.

10. The method of manufacturing a relative humidity sensor according to claim 9, wherein the adhesion layer may comprise at least one chromium adhesion layer.

11. The method of manufacturing a relative humidity sensor according to claim 1, further comprising after the step of forming the pattern of voids, a step of providing a capping layer over the first and/or second electrode.

12. A relative humidity sensor comprising:

a substrate;

a first electrode formed from a layer of metallic material disposed on or over the substrate;

a dielectric layer formed from a non-porous inorganic material disposed over a surface of the first electrode;

a second electrode formed from a layer of metallic material disposed on or over the dielectric layer, wherein the second electrode is the outermost surface of the sensor; and a plurality of voids formed through the second electrode and at least a portion of the dielectric layer, wherein the voids extend to expose a surface of the first electrode, and wherein the voids each have the same configuration and are arranged in a pattern;

wherein the only dielectric layer of the sensor is the dielectric layer disposed between the first and second electrodes.

13. The relative humidity sensor according to claim 12, wherein the dielectric layer is made of silicon nitride or silicon carbide.

14. The relative humidity sensor according to claim 12, wherein the first electrode is patterned to include voids.

15. The relative humidity sensor according to claim 14, wherein a portion of the dielectric layer is disposed in the voids in the first electrode.

16. The relative humidity sensor according to claim 15, wherein the pattern of voids in the first electrode do not overlap the pattern of voids in the second electrode as viewed in a direction perpendicular to the layers.

17. A relative humidity sensor comprising:

a substrate;

a first electrode formed from a first layer of metallic material disposed on or over the substrate;

a dielectric layer formed from a non-porous inorganic material disposed over the first electrode;

a second electrode formed from a second layer of metallic material disposed on or over the dielectric layer, wherein dielectric layer electrically insulates both the first electrode from the second electrode and the first layer of metallic material from the second layer of metallic material; and a plurality of voids formed through the second electrode and at least a portion of the dielectric layer, the voids extending from an outermost surface of the sensor formed by the second electrode to an exposed surface of the first electrode;

wherein the dielectric layer of non-porous inorganic material is selected from the group consisting of silicon carbide and silicon nitride, and wherein such dielectric layer is the only dielectric layer of the sensor.

18. The relative humidity sensor according to claim 17, further comprising voids in the first electrode that are offset from the voids in the second electrodes such that the first and second electrodes in the sensor do not overlap one another when viewed in a direction perpendicular to the layers.

* * * * *